US011022818B2

(12) United States Patent
Gutierrez et al.

(10) Patent No.: US 11,022,818 B2
(45) Date of Patent: Jun. 1, 2021

(54) OPHTHALMIC DEVICE INCLUDING DYNAMIC VISUAL FIELD MODULATION

(71) Applicant: Verily Life Sciences LLC, Mountain View, CA (US)

(72) Inventors: Christian Gutierrez, San Francisco, CA (US); Dmytro Reznikov, Santa Clara, CA (US); Joshua N. Haddock, Mountain View, CA (US); Mimi Yang, Menlo Park, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 219 days.

(21) Appl. No.: 16/155,040

(22) Filed: Oct. 9, 2018

(65) Prior Publication Data

US 2019/0107736 A1 Apr. 11, 2019

Related U.S. Application Data

(60) Provisional application No. 62/570,346, filed on Oct. 10, 2017.

(51) Int. Cl.
*G02C 7/04* (2006.01)
*G02C 7/10* (2006.01)
(Continued)

(52) U.S. Cl.
CPC .............. *G02C 7/049* (2013.01); *G02C 7/04* (2013.01); *G02C 7/101* (2013.01);
(Continued)

(58) Field of Classification Search
CPC .......... G02C 7/049; G02C 7/04; G02C 7/101; G02C 7/083; G02F 1/13318;
(Continued)

(56) References Cited

U.S. PATENT DOCUMENTS 5,172,256 A 12/1992 Sethofer et al.
5,608,567 A 5/1997 Grupp
(Continued)

OTHER PUBLICATIONS

International Search Report and Written Opinion dated Dec. 10, 2018 for corresponding International Application No. PCT/US2018/055075, 12 pages.

*Primary Examiner* — Tuyen Tra
(74) *Attorney, Agent, or Firm* — Christensen O'Connor Johnson Kindness PLLC (57) ABSTRACT

Ophthalmic devices including dynamic visual field modulation are disclosed herein. An example ophthalmic device may include a first liquid crystal cell including a first dichroic dye, a second liquid crystal cell including a second dichroic dye, wherein the first and second liquid crystal cells are in optical series so that incident light on the ophthalmic device passes through both the first and second liquid crystal cells, a photodetector positioned within the ophthalmic device to detect the incident light and coupled to output a data signal indicative of a property of the incident light, and control electronics coupled to receive the data signal from the photodetector in response to the incident light, and further coupled to independently and dynamically control the first and second liquid crystal cells based at least in part on the data signal.

25 Claims, 6 Drawing Sheets

(51) Int. Cl.
  *G02F 1/1343* (2006.01)
  *G02F 1/133* (2006.01)
  *G02F 1/1347* (2006.01)
  G02C 7/08 (2006.01)
  G02F 1/1335 (2006.01)
  G02F 1/29 (2006.01)

(52) U.S. Cl.
  CPC ...... *G02F 1/13306* (2013.01); *G02F 1/13318* (2013.01); *G02F 1/13475* (2013.01); *G02F 1/134309* (2013.01); G02C 7/083 (2013.01); G02F 1/133509 (2013.01); G02F 1/294 (2021.01)

(58) Field of Classification Search
  CPC ............. G02F 1/13475; G02F 1/13306; G02F 1/134309; G02F 2001/294; G02F 1/133509
  USPC ...................... 359/265–275; 345/50, 104, 87
  See application file for complete search history.

(56) References Cited

U.S. PATENT DOCUMENTS

| | | | |
|---|---|---|---|
| 6,674,504 | B1 | 1/2004 | Li et al. |
| 7,333,686 | B1* | 2/2008 | Barbarossa ............ G02B 6/351 |
| | | | 385/18 |
| 8,154,804 | B2 | 4/2012 | McGinn et al. |
| 2013/0048836 | A1 | 2/2013 | Burt et al. |
| 2014/0327875 | A1 | 11/2014 | Blum et al. |
| 2015/0362756 | A1 | 12/2015 | Wiser et al. |
| 2016/0041449 | A1 | 2/2016 | Clark et al. |
| 2016/0299357 | A1 | 10/2016 | Hayashi et al. |
| 2016/0363784 | A1 | 12/2016 | Beaton et al. |

* cited by examiner

OPHTHALMIC DEVICE INCLUDING DYNAMIC VISUAL FIELD MODULATION

CROSS-REFERENCE TO RELATED APPLICATION

This application claims the benefit of U.S. Provisional Application No. 62/570,346, filed Oct. 10, 2017, which is hereby incorporated by reference in its entirety.

TECHNICAL FIELD

This disclosure relates generally to ophthalmic devices, and in particular but not exclusively, relates to eye-mountable devices that include liquid crystal layers that provide dynamic visual field modulation.

BACKGROUND INFORMATION

"Smart" ophthalmic devices have been developed to provide various advantages to a user. For example, smart ophthalmic devices, such as on-eye wearable lenses, have been developed to provide various medical sensing tasks, and to provide accommodation to the user. To provide these tasks, the ophthalmic devices include electronics and optical actuators. For example, liquid crystal technology may be used, in combination with various lens elements, to provide the dynamic accommodation. Such devices may include various techniques to modulate the incident light so that the user can avoid unpleasant and undesirable lighting conditions. For example, the various techniques may be used to provide tinting or filtering to prevent eye-strain and/or migraine-inducing conditions. While various eye-glass and conventional lens technologies exist to provide light changing effects, these technologies typically provide only one type of light changing effect, and likely change slowly, between clear and tinted for example, if they change at all. Accordingly, lenses that quickly and dynamically modulate incident light are desirable for many real-world environments.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system and method for an ophthalmic device including liquid crystal layers that provide dynamic visual field modulation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The eye is exposed to a range of light conditions throughout the day some of which may impact visual acuity, cause discomfort, or even be damaging. For example, bright sunlight can be temporarily blinding and inhibit driving ability. Electronic backlights, such as those found in LCD monitors, can cause eye strain and in some cases trigger migraines. Attempts to mitigate the effects of disruptive lighting (intensity and spectral content) have conventionally been limited to products that statically filter or tint the light that reaches the eye, such as monitor screen filters and sunglasses. These solutions, however, lack the ability to dynamically change their light modulating properties in response to changing light conditions and must be carried, worn or installed at all times making their implementation tedious and cumbersome. In addition, these solutions are by their very construction, conspicuous, making their seamless integration into everyday activities difficult. An eye-mountable platform such as a contact lens solves these problems by offering a discreet and unobtrusive means of achieving dynamic visual field modification in a variety of settings.

In particular, indoor environments such of office work places, the home, or social gatherings are ideal settings for contact lens-based visual field modulation. There are however many other environments and situations where rapid and discreet visual field adjustment may be valuable. Some examples include outdoor/indoor sports where color and contrast of a moving object may be improved under fast changing light conditions, e.g., "lost in the lights" effects. Another example is night blindness from oncoming traffic which could be improved through rapidly adjusting light attenuation. A final example is in the management of photophobia (light sensitivity) which may be associated with a significant portion of the 30 million migraine sufferers in the US. In particular sensitivity to short wavelength (<460 nm, color temperatures 5500-6500K) has been linked to migraine triggering and is associated with overall eye strain and discomfort.

This invention solves the problem of dynamically modulating light entering the eye (intensity and spectral content, for example) through an eye-mountable device implementing a closed loop feedback system. The invention is a device that detects the intensity and spectral content of ambient light and modulates the transmission properties of an electro-optic contact lens to dynamically and discreetly adjust the visual field of the user.

Figure 1A:
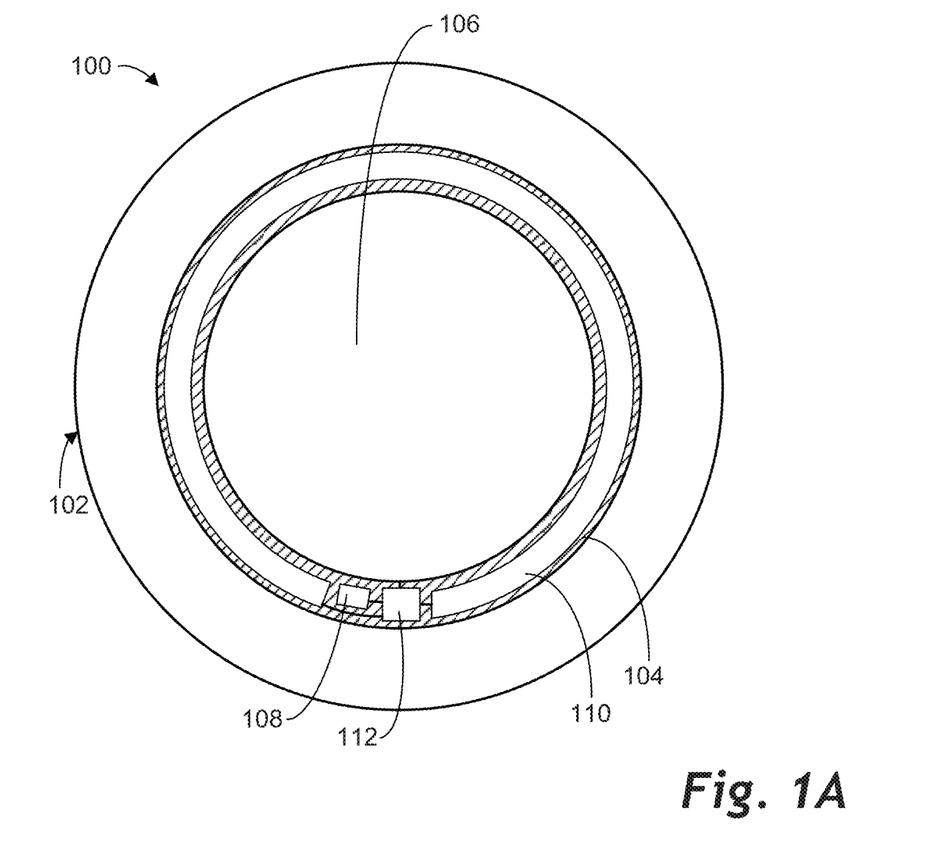
FIG. 1A is an example plan view illustration of an ophthalmic device including liquid crystal cells in accordance with an embodiment of the present disclosure.

FIG. 1A is an example plan view illustration of an ophthalmic device 100 including liquid crystal cells in accordance with an embodiment of the present disclosure. The ophthalmic device 100 may be an on-eye wearable device that includes one or more electro-optic devices that at least provide incident light attenuation and/or filtering. In some embodiments, the ophthalmic device 100 further includes a dynamic optic that provides accommodation to a user. The ophthalmic device 100 may include electronics and various interconnections to control the one or more electro-optic devices and/or the dynamic optic. The electro-optic devices and the dynamic optic, if included, may be formed from a stack of optical elements and/or electro-optic devices, each receiving a control signal to modulate an associated index of refraction, which alters incident light and/or provides accommodation. In some embodiments, the electro-optic devices and the dynamic optic are based on liquid crystal technology, and the electro-optic devices may further include dopants to modulate a characteristic of the incident light, such as through attenuation and/or filtering.

The illustrated embodiment of the ophthalmic device 100 includes an enclosure 102, substrate 104, optical stack 106, photodetector 108, control electronics 112, and an antenna 110. The optical stack 106 may include two, three, or more electro-optical devices, but the number of electro-optical devices should not be considered a limiting feature of the present disclosure. An electro-optical device, which will be further defined below, may be a liquid crystal (LC) based cell that includes associated optical elements, electrodes and various other structures, such as LC alignments layers, polarizers, optics (diffractive and/or refractive), etc. The enclosure 102, which may be a soft overmold, may be formed from soft, flexible biocompatible materials, such as polymeric material like polymethyl methacrylate ("PMMA"), polyhydroxyethylmethacrylate ("poly-HEMA"), a hydrogel, silicon based polymers (e.g., flourosilicone acrylate), combinations of these or otherwise. In some embodiments, the soft overmold provides a surface for intimate contact with a user's cornea, for example.

In some embodiments, the optical stack 106 may take the shape of a hemispherical shell, and may have a posterior side, e.g., eye-facing side, that is concave, and an anterior side, e.g., external facing side, that is convex. The shape of the optical stack 106 may also inform the shape of the individual electro-optical devices forming the optical stack 106. The concave side, in some embodiments, may have a radius of curvature commensurate with a radius of curvature of a user's cornea. Further, the individual electro-optical devices of the optical stack 106 may be formed from one or more rigid or semi-rigid biocompatible materials amenable to being worn on an eye. For example, the individual optical elements of the optical stack 106 may be formed from one or more of polyurethane, acrylic (PMMA), polyimide, silicon-based polymers, silicone acrylate, rigid gas permeable fluorosilicone acrylate, and the like.

The illustrated embodiment of the ophthalmic device 100 may have an optical area encompassing a central diameter and centered on an optical axis of the optical stack 106. The optical area may be 4 to 6 mm in diameter and is indicated by the white area in the center of the optical stack 106. The ophthalmic device 100 may further have an outer or peripheral area encompassing the optical area. The peripheral area may extend from the outer diameter of the optical area to a diameter of 10 to 15 mm. As worn on an eye, the optical area may align with a user's cornea and the user's vision, while the peripheral area may be outside of the user's vision.

Each of the electro-optical devices of the optical stack 106 may modulate incident light differently, and the same incident light may propagate through all of the electro-optical devices of the optical stack 106. For example, one electro-optic device may attenuate the incident light across visible wavelengths, while another electro-optic device filters a desired band of wavelengths. For example, wavelengths ranging from ultraviolet to blue may be filtered out of the incident light. Alternatively, one electro-optic device provides narrowband filtering over a desired wavelength range, short wavelengths for example, while another electro-optic device provides narrowband filtering over a different wavelength range that does not overlap with the other, and a range of wavelengths between the two may not be effected to enhance mid-wavelength contrast. For example, one may filter short and UV wavelengths, while the other filters long and near-infrared wavelengths. Additionally, another electro-optic device may provide a dynamic optic that provides accommodation for a user. In some embodiments, the light attenuating/filtering dopants are dichroic dyes. Different dichroic dyes may be included with a liquid crystal material in the electro-optical devices depending on the desired modulation, e.g., attenuation, filtering, etc. The dichroic dyes may move along with the liquid crystals to provide the desired effect. In some embodiments, the desired effect may be provided at varying degrees of strength depending on a voltage level applied to their respective electro-optical devices.

Each of the electro-optic devices may be coupled to the control electronics 112 and independently operated. As such, each electro-optic device may be separately enabled and disabled to provide their associated light modulation characteristic. Additionally, each electro-optic device may be enabled over a range of voltage, for example, so their associated attenuation/filtering characteristics may be independently increased and decreased based on a light intensity environment. Accordingly, a matrix of light modulation may be possible, which may include no modulation, attenuation, filtering, or both attenuation and filtering. Additionally, accommodation may be provided along with the other light modulation characteristics.

The photodetector 108 may be positioned to receive the incident light and measure light intensity with respect to wavelength. The measured light intensity at various wavelengths may be used to determine a modulation state of the ophthalmic device 100. For example, high light intensity in the blue wavelengths may cause the ophthalmic device 100 to enable the electro-optic device configured to filter shorter wavelengths of the incident light. Further, high light intensity in the red wavelengths and/or across the visible spectrum may cause the ophthalmic device 100 to enable the electro-optic device configured to attenuate the incident light. In some embodiments, the photodetector 108 is a photodiode capable of detecting red, green and blue wavelengths, which may also include an infrared filter. In other embodiments, the photodetector 108 includes two photodiodes with one tuned to the red wavelengths and the other tuned to the blue wavelengths. In yet other embodiments, the photodetector 108 is a spectral sensor.

Control electronics 112 may be coupled to choreograph the operation of the ophthalmic device 100. In some embodiments, the control electronics 108 may be disposed on an annular-shaped substrate 104 that encompasses at the least the optical area. Further, the substrate 104 may provide mechanical support to and encompass the optical stack 106. The control electronics 112 may provide a voltage to one or more of transparent conductors included in the optical stack 106 to establish a potential difference across two or more electro-optical devices of the optical stack 106. The potential difference may cause the liquid crystals in the electro-optic device(s) to rotate about an axis. The change in orientation of the liquid crystals may change the index of refraction of the liquid crystal material. As such, there may be a change in index of refraction between optical elements of the optical stack 106 and the LC material. Additionally, the rotation of the LC material may also at least cause the attenuating/filtering dopants to rotate, providing the desired light modulation as a result. A dynamic optic included in the optical stack 106 may similarly operate, but may change an associated optical power to provide the desired accommodation.

Figure 1B:
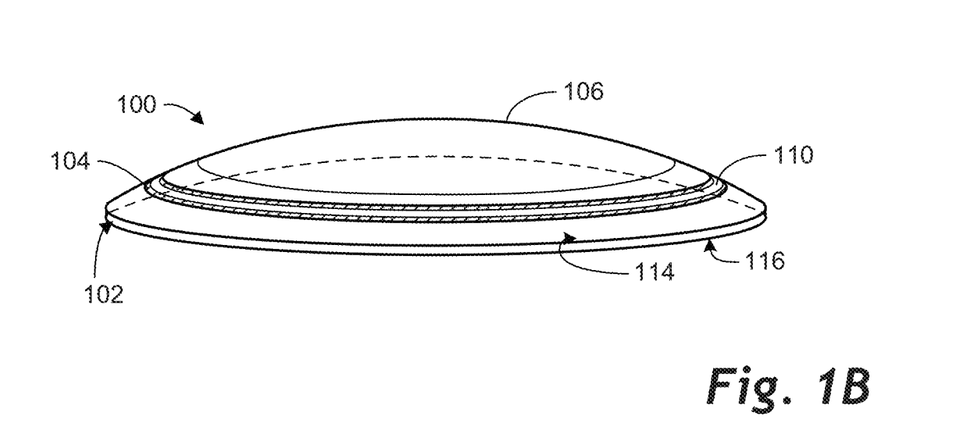
FIG. 1B is an illustrative perspective view of ophthalmic device in accordance with an embodiment of the present disclosure.

FIG. 1B is an illustrative perspective view of ophthalmic device 100 in accordance with an embodiment of the present disclosure. The illustrative perspective view of the ophthalmic device 100 shows the cornea-fitting shape, and further shows first and second enclosure portions 114 and 116, respectively, along with some of the other features of FIG. 1A. The two portions may be sealed together at an edge, for example, to imbed the various other features within the enclosure 102.

In some embodiments, the enclosure 102 is formed from two separate portions, an anterior and a posterior portion for example. In such an embodiment, the enclosure portion 114 may be the anterior portion and the enclosure portion 116 may be the posterior portion. The two enclosure portions may be formed separately from a biocompatible material, examples listed above, prior to being molded around the various other components of the ophthalmic device 100. For example, one of the enclosure portions, such as the anterior portion 114 may be placed in a mold prior to placement of the optical stack 106 and substrate 104, which may already be populated with the photodetector 108, antenna 110, and control electronics 112. The posterior portion 116 may then be placed over the anterior portion 114 and the other components prior to a heating step configured to seal the two portions 114 and 116 together, at least at the edge. However, alternatively, the optical stack 106 and the populated substrate 104 may be placed in a mold using standoffs, for example, before the enclosure 102 is molded around them to form the ophthalmic device 100.

Figure 2:
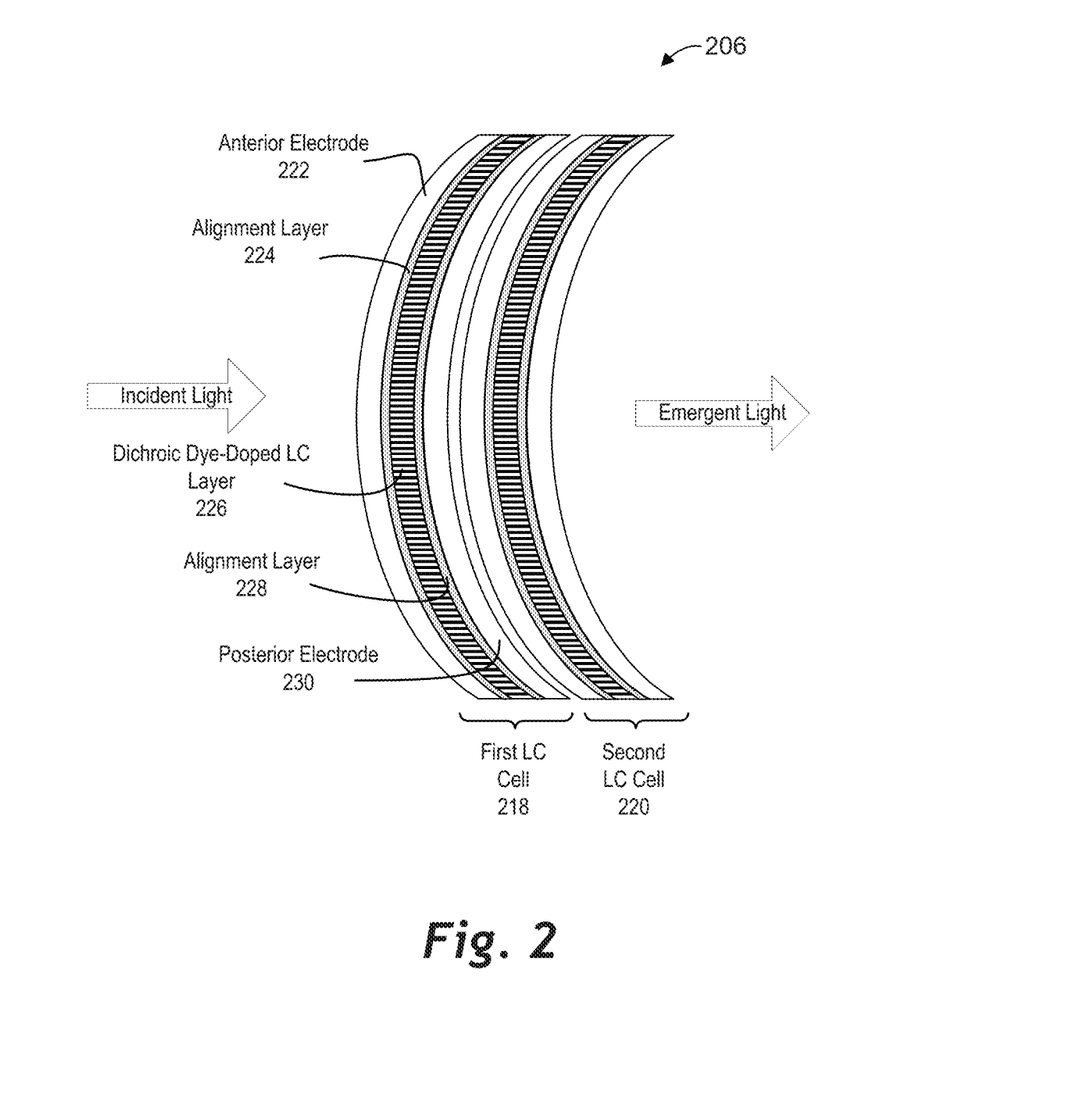
FIG. 2 illustrates an optical stack in accordance with an embodiment of the present disclosure.

FIG. 2 illustrates an optical stack 206 in accordance with an embodiment of the present disclosure. The optical stack 206, which may be an example of the optical stack 106, may modulate incident light to provide emergent light of desired qualities. For example, the optical stack 206 may be able to attenuate, filter, or both attenuate and filter the incident light to provide attenuated and/or filtered emergent light. In some embodiments, the attenuation and filtering may be controlled by a controller, such as the control electronics 112, based on spectral analysis of ambient light conditions, and the amount of attenuation and/or filtering may be altered based on those conditions and desired user settings.

The illustrated embodiment of the optical stack 206 includes first and second LC cells 218 and 220, respectively. The first and second LC cells 218 and 220 may be examples of the electro-optic devices of the optical stack 106. The first and second LC cells 218 and 220 may be arranged in optical series so that the incident light propagates through both of the LC cells to provide the emergent light. The illustrated embodiment of the first LC cell 218 includes an anterior electrode 222, an alignment layer 224, a dichroic dye-doped LC layer 226, an alignment layer 228, and a posterior electrode 230. The second LC cell 220 includes similar features as the first LC cell 218, which will not be separately discussed for sake of brevity. However, the dichroic dye-doped layer of the second LC cell 220 may be different than that of the first LC cell 218. For example, the dichroic dye of the first LC cell 218 may be a grey-scale dye, e.g., a broadband neutral density dye, for attenuating light across the visible spectrum, whereas the dichroic dye of the second LC cell 220 may be a yellow dichroic dye for narrowband filtering light. The narrowband filtering dichroic dye may filter different wavelength ranges based on a lighting environment. For example, the narrowband filter may filter short wavelengths, or it may filter long wavelengths. In some embodiments, the dichroic dye-doped layer 226 of the first cell 218 is a narrowband filtering dye covering a range of short wavelengths of the visible and UV spectrum, and the dichroic dye-doped layer of the second cell 220 is a narrowband filtering dye covering a range of long wavelengths of the visible and near infrared spectrum. In general, the first and second cells 218 and 220 may include any combination of narrowband and broadband dyes as desired.

The anterior electrode 222 may be formed from a transparent or semitransparent conductive material, and may provide one conductor for establishing a potential difference across the dichroic dye-doped LC layer 226. The anterior electrode 222 may be coupled to control electronics, such as the control electronics 112, which may provide a voltage for establishing the potential difference. The voltage may either be AC or DC based. The anterior electrode 222 may be formed from indium tin oxide (ITO), a nanowire mesh (e.g., silver nanowire mesh), a conductive polymer (e.g., poly polystyrene sulfonate—PEDOT)), and the like. In some embodiments, the anterior electrode 222 may be deposited on an optical element. The optical element may be a transparent or semi-transparent optical window that may or may not have static optical power. In some embodiments, the optical elements may be formed from transparent or partially transparent polymerics or thin glass. Example polymerics include Polydimethylsiloxane, hydrophobic acrylic (e.g., AcrySof), silicones, acrylics, epoxies, urethanes, combinations thereof, and the like.

The alignment layer 224, which may also be referred to as an anterior alignment layer, may provide rotational alignment features for the liquid crystal in the dichroic dye-doped LC layer 226. The alignment may set an orientation of the liquid crystals in an off, or default, state. In some embodiments, the alignment may be slightly off normal, such as 5 degrees or more. The alignment layer 224 may include micro- or nano-sized ridges/channels that provide a surface energy for aligning the liquid crystals in a desired orientation. In some embodiments, the alignment layer 224 may be formed from rubbing the ridges/channels into a polymer layer, or they may be formed through molding or milling an underside of an optical element, such as the optical element discussed above with respect to the anterior electrode 222.

The dichroic dye-doped LC layer 226 may be formed from a transparent material including liquid crystals and dichroic dye. This arrangement may be referred to as a "Guest-Host" arrangement. Positive dichroic dye absorbs light polarized along a long axis of the dye molecule, while negative dichroic dye absorbs light polarized perpendicular to the long axis of the dye molecule. When the LC molecules change their orientation due to a potential difference, for example, the dichroic dye molecules rotate along the LC molecules, and consequently, the absorption axis of the dye molecules changes. As such, the light modulation is modulated, e.g., changed, an amount based on the amount of rotation. As noted, the type of dye molecule used determines the wavelengths of the incident light that may be modulated providing selective and dynamic control of the spectral content of the emergent light.

The optical stack 206 may be referred to as a double guest-host, and the first and second LC cells 218, 220 may be orthogonally oriented LC cells so that both polarization orientations, e.g., vertical and horizontal, of the incident light may be attenuated. In an OFF state, an LC director, e.g., an average direction of the liquid crystal molecules and the dye molecules may align parallel to the surface alignment layer 224 and/or 228, and the two directions of polarized lights may be absorbed. In an ON state, on the other hand, both the director and the dye align perpendicular to the surface alignment layer 224 and/or 228, and the light may pass through. Because no polarizer layers may be required, high OFF state transmission may be obtained. Alternatively, LC materials that have a dielectric permittivity anisotropy $\Delta\varepsilon<0$ may also be used, and in such an embodiment, the ON and OFF states are opposite to LC materials with $\Delta\varepsilon>0$. In addition to the different dielectric anisotropy of the LC materials, positive or negative dichroic dyes may be used, where positive dichroic dye absorbs light polarized along its long axis, and negative dichroic dye absorbs dye perpendicular to its long axis. The choice of the polarity of the LC material and the dichroic dye may be dictated by the application. In some embodiments, it may be desirable to select the polarities so that the unpowered state, e.g., the OFF state, corresponds to the default usage mode of the optical stack 206.

In operation, a voltage is applied to the anterior and posterior electrodes 222, 230 generates an electric field across the dichroic dye-doped layer 226, which orients the LC material, and may be referred to as an ON state. The magnitude of the applied voltage controls the electric field strength and the extent of the alignment of the LC molecules with the electric field direction. Accordingly, incident light transmission through the LC cell may be modulated an amount based on the magnitude of the applied voltage resulting in modulated emergent light. The various operational states may be based on the number of LC cells in the optical stack 206. For example, one operational state may have the first LC cell 218 receiving a voltage, e.g., in an ON state, and the second LC cell 220 not receiving a voltage, e.g., in an OFF state. In such an example, the incident light may only be modulated by the first LC cell 218, and the type of modulation, e.g., attenuation or filtering, will depend on the dichroic dye in the dichroic dye-doped LC layer 226. Another example may have both the first and second LC cells 218, 220 in an ON state to provide emergent light of a desired condition, e.g., filtered and attenuated. In some embodiments, the control of the first and second LC cells 218, 220 may be dynamic based on environmental conditions and their respective operation may be individually adjusted due to changes in the environmental conditions.

Figure 3A:
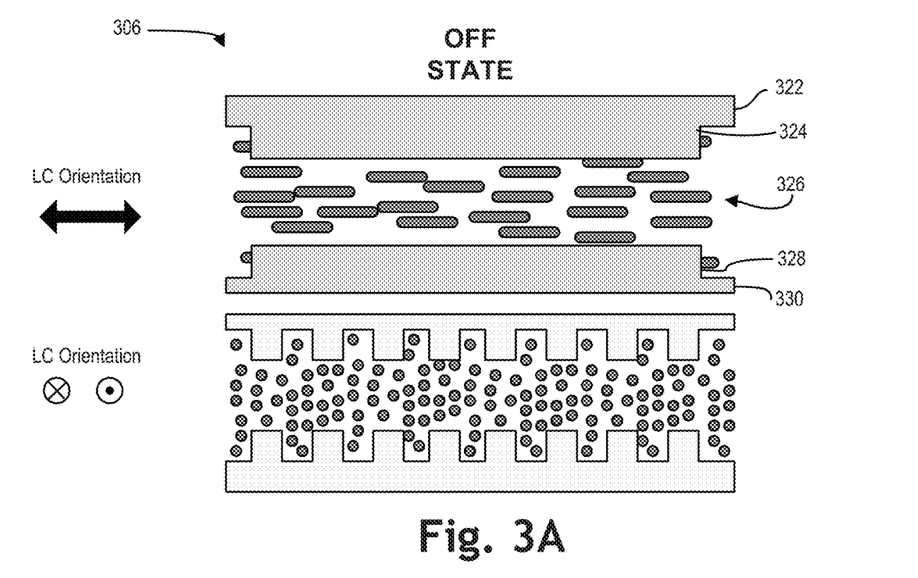
FIGS. 3A through 3D are illustrative block diagrams of an optical stack in different operating states in accordance with an embodiment of the present disclosure.
Figure 3B:
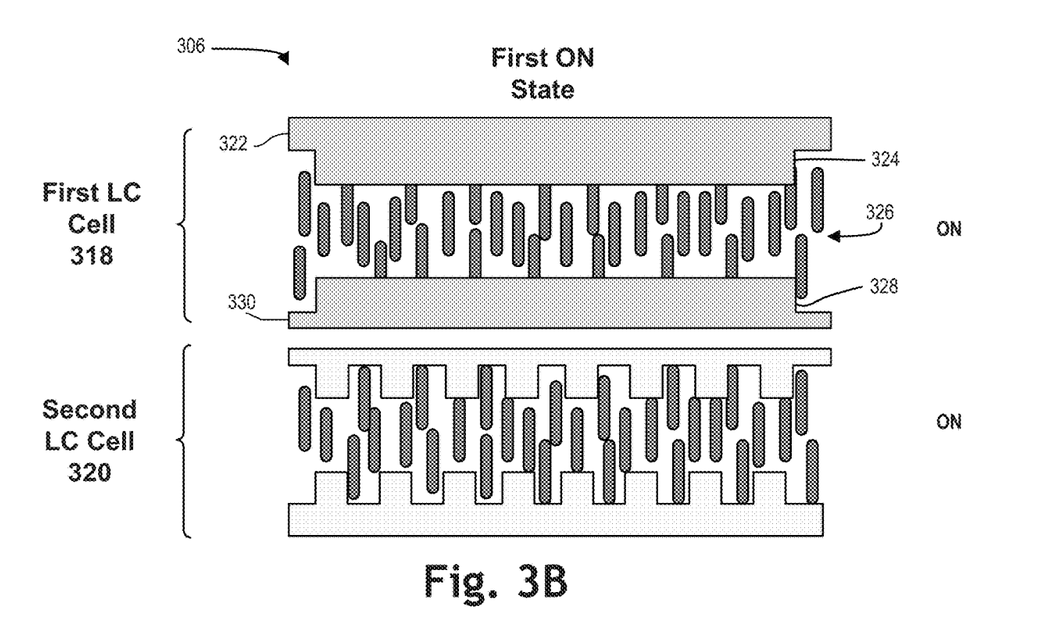
Figure 3C:
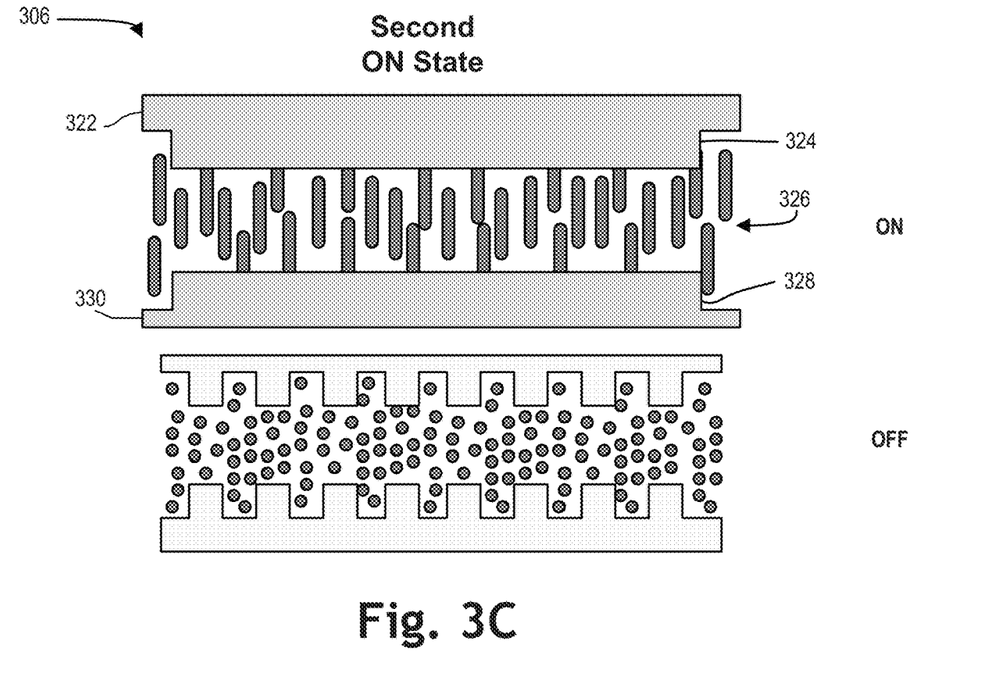
Figure 3D:
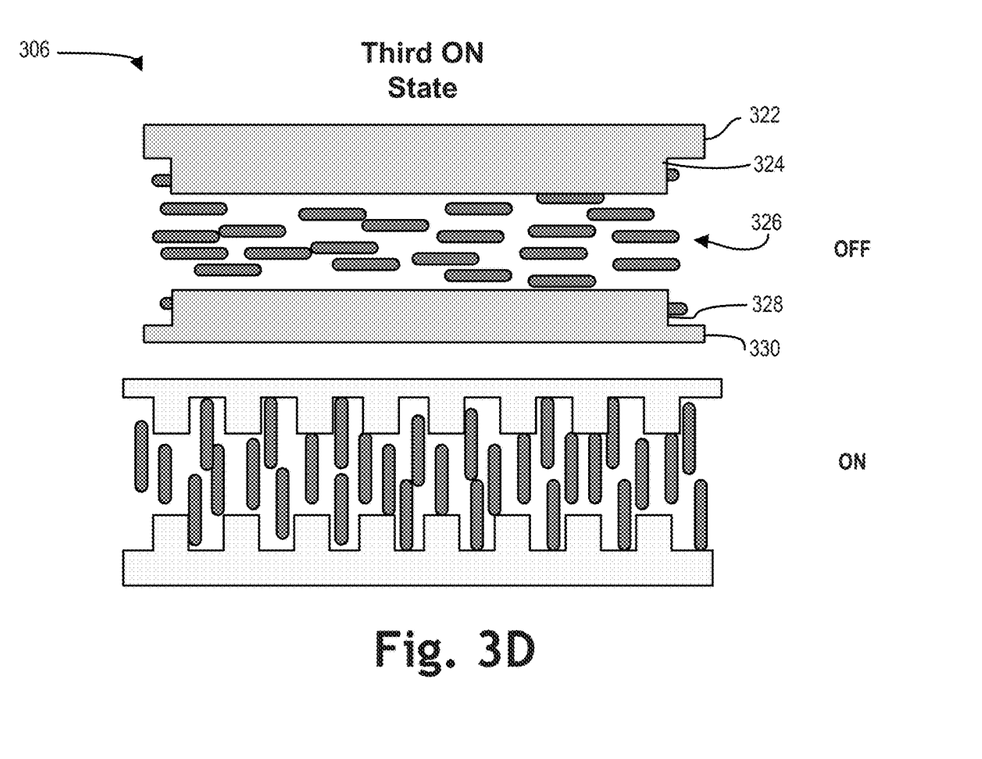

FIGS. 3A through 3D are illustrative block diagrams of an optical stack 306 in different operating states in accordance with an embodiment of the present disclosure. The FIGS. 3A through 3D provide an example visual representation of the matrix of visual modulation states of the optical stacks 106 and/or 206. Specifically, FIG. 3A shows the optical stack 306 in an OFF state, while FIGS. 3B-3D show the optical stack 306 in first, second and third ON states, respectively. The first, second, and third ON states represent various potential operating modes of the optical stack 306, such as attenuation, filtering, and both filtering and attenuation. While not shown in FIGS. 3A through 3D, the optical stack 306 may have three or more LC cells, and at least one of those LC cells would provide a dynamic optic for providing accommodation to a user.

The illustrated embodiment of the optical stack 306 includes first and second LC cells 318 and 320. The illustrated embodiments of the first and second LC cells 318 and 320 both include first and second electrodes, first and second alignment layers, and a dichroic dye-doped LC layer. For example, the first LC cell 318 includes a first electrode 322, a first alignment layer 324, a dichroic dye-doped LC layer 326, a second alignment layer 328 and a second electrode 330. In some embodiments, the first electrode 322 and the first alignment layer 324 may be anterior electrode and alignment layers, whereas the second electrode layer 330 and the second alignment layer 328 may be posterior electrode and alignment layers. Of course, the reverse could also be implemented. While specific layers of the second LC cell 320 are not identified in FIGS. 3A through 3D, the second LC cell 320 includes similar layers as does the first LC cell 318, and will not be separately discussed herein for sake of brevity.

The first electrode 322 and the first alignment layer 324 may be formed or disposed on a first optical element. The first optical element may provide structural support to the first electrode 322 and the first alignment layer 324. In some embodiments, the first electrode has static optical power. In other embodiments, the first electrode does not have optical power. The second alignment layer 328 and the second electrode 330 may be similarly disposed or formed on a second optical power that may or may not have static optical power. The electrode and alignment layers of the second LC cell 320 may be similar to those of the first LC cell 318.

The first and second alignment layers of the first and second LC cells 318 and 320 may be formed from grooves/channels. The grooves/channels of each alignment layer for each LC cell may be disposed in parallel to one another. For example, the first alignment layer 324 and the second alignment layer 328 may be parallel to one another and run along the page in FIGS. 3A through 3D, whereas the first and second alignment layers of the second LC cell 320 may be parallel to one another and both run in and out of the page. Additionally, the alignment layers of the first LC cell 318 may be arranged perpendicular to the alignment layers of the second LC cell 320. Arranging the alignment layers of the first LC cell 318 perpendicular to the alignment layers of the second LC cell 320 may eliminate the need of polarizers used in conjunction with the optical stack 306.

The reference to operating state, such as first, second and third ON state, does not imply a specific voltage level, but a minimum voltage level to obtain the desired operating state. Within each operating state, it should be understood, the level of applied voltage may increase or decrease the characteristics of the specific operating state. For example, if an operating state only provides attenuation, then a minimum voltage to obtain such operating state may provide a low level of attenuation, while higher voltage levels may increase the amount of attenuation. The same may be true for filtering as well. As such, each operating state may provide a range of the desired operating characteristic, and does not indicate a binary type of operation, e.g., on or off.

Referring to FIG. 3A, the optical stack is depicted in an OFF state, which in some embodiments may be a default state for the optical stack 306. The OFF state may be obtained by not providing (or removing) a voltage to the conductors of both the first and second LC cells 318 and 320 so that electric fields are not established across their respective dichroic dye-doped LC layers. Stated another way, the OFF state denotes that no voltages are provided to either the first or second LC cells 318, 320. The absence of a potential difference across the first and second LC cells 318 and 320 may cause the liquid crystals in the LC materials 318 and 320 to be in their un-rotated orientation, such as in plane with or parallel to the alignment layers 324 and 328, for example. As shown in FIG. 3A, the liquid crystals in the first LC cell 318 may be aligned in plane with the page, and the liquid crystals in the second LC cell 320 may be aligned in and out of the page. Depending on the polarity selection of the LC materials and the dichroic dyes used in the first and second LC cells 318 and 320, the OFF state may provide no attenuation or filtering, or could alternatively provide attenuation and/or filtering of incident light.

Referring to FIG. 3B, to produce the first ON state, a voltage is applied to first and second conductors of both the first and second LC cells 318 and 320. The applied voltage may establish a potential difference across the dichroic dye-doped layers of both LC cells. The potential differences via the electric fields may induce a rotation of the liquid crystals in the dichroic dye-doped layers of both LC cells. The rotation of the liquid crystals may alter the index of refraction of the LC materials, which may at least cause the dichroic dyes included in the first and second LC cells 318, 320 to interact with light propagating through the optical stack 300. Additionally, since both LC cells are ON, the incident light may be attenuated and filtered. Further, the level of the applied voltage may determine the amount of rotation, and thus the amount of attenuation and filtering. The orientation of the liquid crystals and the dichroic dyes as shown in FIG. 3A is for homogenous alignment. As such, in the first ON state, the liquid crystals may orient normal to the optical elements.

Referring to FIG. 3C, to produce the second ON state, a voltage may be applied to the first and second conductors 322, 330 of the first LC cell 328, but the second LC cell 320 does not receive a voltage, e.g., is in a default state. Depending on the type of dichroic dye in the dichroic dye doped LC layer 326, the optical stack may either be attenuating incident light across visible wavelengths, or it may be filtering short wavelength light. Additionally, the level of the applied voltage may determine the amount of attenuation or filtering. Referring to FIG. 3D, to produce the third ON state, a voltage may be provided to the second LC cell 320, and the first LC cell 318 may be in a default state. The third ON state may be the opposite of the second ON state, and the dichroic dye of the second LC cell 320 may modulate the incident light while the first LC cell does not affect the incident light. As noted, the level of the applied voltage may determine the amount of attenuation or filtering. As such, if the second ON state results in attenuation, then the third ON state may result in filtering. Of course, the opposite may also be implemented.

Figure 4:
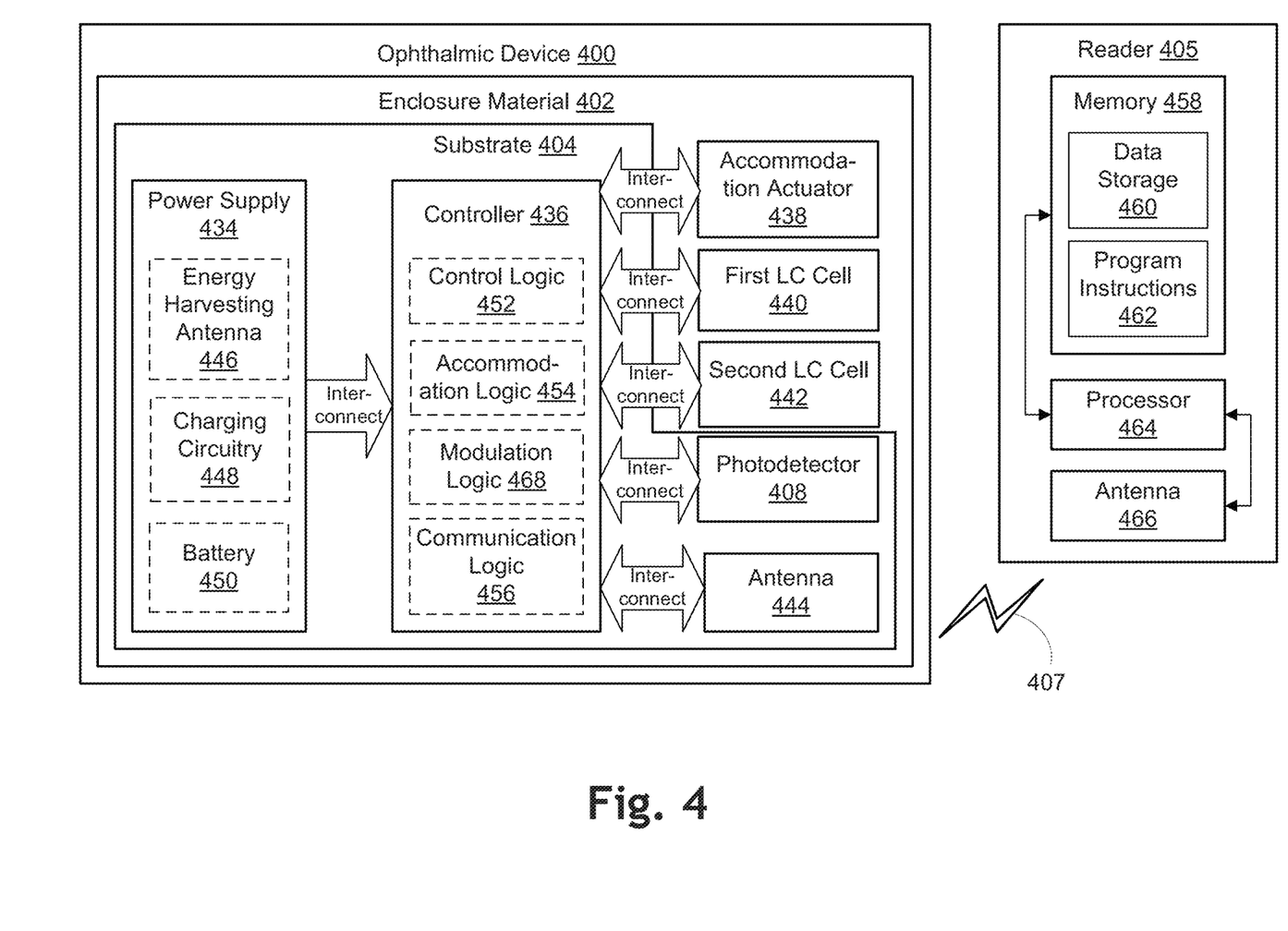
FIG. 4 is a functional block diagram of an ophthalmic device in accordance with an embodiment of the present disclosure.

FIG. 4 is a functional block diagram of an ophthalmic device 400 in accordance with an embodiment of the present disclosure. Ophthalmic device 400 may be an on-eye device, such as a contact lens or a smart contact lens. In the depicted embodiment, ophthalmic device 400 includes an enclosure material 402 formed to be contact-mounted to a corneal surface of an eye. A substrate 404 is embedded within or surrounded by enclosure material 402 to provide a mounting surface for a power supply 434, a controller 436, an antenna 444, photodetector 408, and various interconnects. The substrate 404 and the associated electronics may be one implementation of the control electronics 112 and the substrate 104. The illustrated embodiment of power supply 434 includes an energy harvesting antenna 446, charging circuitry 448, and a battery 450. The illustrated embodiment of controller 436 includes control logic 452, accommodation logic 438, and communication logic 456, and modulation logic 468. As shown, accommodation actuator 438, first LC cell 440, and second LC cell 442 are disposed in the enclosure material 402.

Power supply 434 supplies operating voltages to the controller 436 and/or the accommodation actuator 438. Antenna 444 is operated by the controller 436 to communicate information to and/or from ophthalmic device 400. In the illustrated embodiment, antenna 444, controller 436, and power supply 434 are disposed on/in substrate 404, while accommodation actuator 438, first LC cell 440, and second LC cell 442 are disposed in enclosure material 402 (not in/on substrate 404). However, in other embodiments, the various pieces of circuitry and devices contained in ophthalmic device 400 may be disposed in/on substrate 404 or in enclosure material 402, depending on the specific design of ophthalmic device 400. For example, in one embodiment, accommodation actuator 438, first LC cell 440, and second LC cell 442 may be disposed on one or more transparent substrates, such as used to form optical stack 106, 206, and/or 306.

Substrate 404 includes one or more surfaces suitable for mounting controller 436, power supply 434, photodetector 408, and antenna 444. Substrate 404 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or silver nanowire mesh) can be patterned on substrate 404 to form circuitry, electrodes, etc. For example, antenna 444 can be formed by depositing a pattern of gold or another conductive material on substrate 404. Similarly, interconnects can be formed by depositing suitable patterns of conductive materials on substrate 404. A combination of resists, masks, and deposition techniques can be employed to pattern materials on substrate 404. Substrate 404 can be a relatively rigid material, such as polyethylene terephthalate ("PET") or another material sufficient to structurally support the circuitry and/or electronics within enclosure material 402. Ophthalmic device 400 can alternatively be arranged with a group of unconnected substrates rather than a single substrate 404. For example, controller 436 and power supply 434 can be mounted to one substrate 404, while photodetector 408 and antenna 444 are mounted to another substrate 404 and the two can be electrically connected via interconnects. Substrate 404 may also be a continuous piece of semiconductor, housing all or some of the aforementioned pieces of device architecture as integrated circuitry.

Substrate 404 can be shaped as a flattened ring with a radial width dimension sufficient to provide a mounting platform for the embedded electronic components. Substrate 404 can have a thickness sufficiently small to allow substrate 404 to be embedded in enclosure material 402 without adversely influencing the profile of ophthalmic device 400. Substrate 404 can have a thickness sufficiently large to provide structural stability suitable for supporting the electronics mounted thereon. For example, substrate 404 can be shaped as a ring with a diameter of about 10 millimeters, a radial width of about 1 millimeter (e.g., an outer radius 1 millimeter larger than an inner radius), and a thickness of about 50 micrometers. In some embodiments, the substrate 404 may encircle at least the optical area of an associated optical stack, and may be disposed at least between one or more optical elements of the associated optical stack. For example, the substrate 404 may be disposed in a peripheral area of the optical stack 106 and in between at least two optical elements, such as optical elements 114 and 116, of the optical stack. Substrate 404 can optionally be aligned with the curvature of the eye-mounting surface of ophthalmic device 400 (e.g., convex surface). For example, substrate 404 can be shaped along the surface of an imaginary cone between two circular segments that define an inner radius and an outer radius. In such an example, the surface of substrate 404 along the surface of the imaginary cone defines an inclined surface that is approximately aligned with the curvature of the eye mounting surface at that radius.

In the illustrated embodiment, power supply 434 includes a battery 450 to power the various embedded electronics, including controller 436. Battery 450 may be inductively charged by charging circuitry 448 and energy harvesting antenna 446. In one embodiment, antenna 444 and energy harvesting antenna 446 are independent antennae, which serve their respective functions of energy harvesting and communications. In another embodiment, energy harvesting antenna 446 and antenna 444 are the same physical antenna that are time shared for their respective functions of inductive charging and wireless communications with reader 405. Additionally or alternatively, power supply 434 may include a solar cell ("photovoltaic cell") to capture energy from incoming ultraviolet, visible, and/or infrared radiation. Furthermore, an inertial power scavenging system can be included to capture energy from ambient vibrations.

Charging circuitry 448 may include a rectifier/regulator to condition the captured energy for charging battery 450 or directly power controller 436 without battery 450. Charging circuitry 448 may also include one or more energy storage devices to mitigate high frequency variations in energy harvesting antenna 446. For example, one or more energy storage devices (e.g., a capacitor, an inductor, etc.) can be connected to function as a low-pass filter.

Controller 436 contains logic to choreograph the operation of the other embedded components. Control logic 452 controls the general operation of ophthalmic device 400, including providing a logical user interface, power control functionality, etc. Accommodation logic 438 includes logic for receiving signals from sensors monitoring the orientation of the eye, determining the current gaze direction or focal distance of the user, and manipulating accommodation actuator 438 (focal distance of the contact lens) in response to these physical cues. The auto-accommodation can be implemented in real-time based upon feedback from gaze tracking, or permit the user to select specific accommodation regimes (e.g., near-field accommodation for reading, far-field accommodation for regular activities, etc.). Modulation logic 468 includes logic for receiving signals from the photodetector 408, determining an operational state, e.g., a first ON state, to place the ophthalmic device 400 into, and manipulating one or both of the first and second LC cells 440, 442 in response. Changing an operating state of the ophthalmic device 400 may be performed in real time by implementing process 515 (see FIG. 5) to provide emergent light of a desired character based on the incident light characteristics, for example. Further, depending on the level of voltage applied, the amount of attenuation, filtering, or both, may be gradually increased/decreased to obtain the desired characteristics.

Communication logic 456 provides communication protocols for wireless communication with reader 405 via antenna 444. In one embodiment, communication logic 456 provides backscatter communication via antenna 444 when in the presence of an electromagnetic field 407 output from reader 405. In one embodiment, communication logic 456 operates as a smart wireless radio-frequency identification ("RFID") tag that modulates the impedance of antenna 444 for backscatter wireless communications. The various logic modules of controller 436 may be implemented in software/firmware executed on a general purpose microprocessor, in hardware (e.g., application specific integrated circuit), or a combination of both.

Ophthalmic device 400 may include various other embedded electronics and logic modules. For example, a light source or pixel array may be included to provide visible feedback to the user. An accelerometer or gyroscope may be included to provide positional, rotational, directional or acceleration feedback information to controller 436.

The illustrated embodiment also includes reader 405 with a processor 464, an antenna 466, and memory 458. Memory 458 in reader 405 includes data storage 460 and program instructions 462. As shown reader 405 may be disposed outside of ophthalmic device 400, but may be placed in its proximity to charge ophthalmic device 400, send instructions to ophthalmic device 400, and/or extract data from ophthalmic device 400. In one embodiment, reader 405 may resemble a conventional contact lens holder that the user places ophthalmic device 400 in at night to charge, extract data, clean the lens, etc.

External reader 405 includes an antenna 466 (or group of more than one antennae) to send and receive wireless signals 407 to and from ophthalmic device 400. External reader 405 also includes a computing system with a processor 464 in communication with a memory 458. Memory 458 is a non-transitory computer-readable medium that can include, without limitation, magnetic disks, optical disks, organic memory, and/or any other volatile (e.g., RAM) or non-volatile (e.g., ROM) storage system readable by the processor 464. Memory 458 can include a data storage 460 to store indications of data, such as data logs (e.g., user logs), program settings (e.g., to adjust behavior of ophthalmic device 400 and/or external reader 405), etc. Memory 458 can also include program instructions 462 for execution by processor 464 to cause the external reader 405 to perform processes specified by the instructions 462. For example, program instructions 462 can cause external reader 405 to provide a user interface that allows for retrieving information communicated from ophthalmic device 400 or allows transmitting information to ophthalmic device 400 to program or otherwise select operational modes of ophthalmic device 400. External reader 405 can also include one or more hardware components for operating antenna 466 to send and receive wireless signals 407 to and from ophthalmic device 400.

External reader 405 can be a smart phone, digital assistant, or other portable computing device with wireless connectivity sufficient to provide the wireless communication link 407. External reader 405 can also be implemented as an antenna module that can be plugged into a portable computing device, such as in an embodiment where the communication link 407 operates at carrier frequencies not commonly employed in portable computing devices. In some instances, external reader 405 is a special-purpose device configured to be worn relatively near a wearer's eye to allow the wireless communication link 407 to operate with a low power budget. For example, the external reader 405 can be integrated in a piece of jewelry such as a necklace, earing, etc. or integrated in an article of clothing worn near the head, such as a hat, headband, etc.

Figure 5:
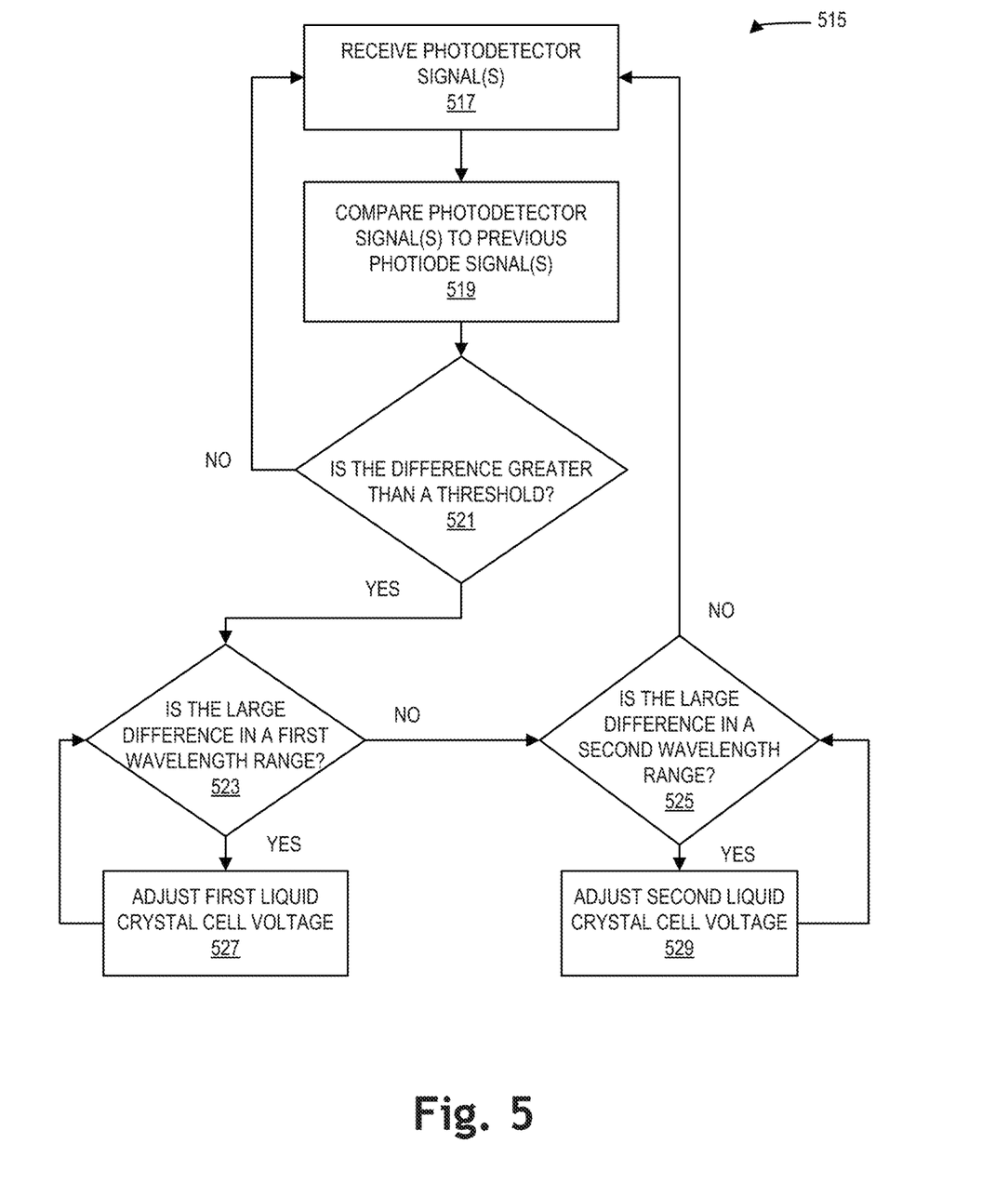
FIG. 5 is an illustrative method in accordance with an embodiment of the present disclosure.

FIG. 5 is an illustrative method 515 in accordance with an embodiment of the present disclosure. The method 515 may provide one example of a method of dynamic visual field modulation using an ophthalmic device 100 and/or 400, for example. The method 515 outlines an example algorithm for determining when to enable one or more light modulation cells, e.g., electro-optical devices, and further determines how much voltage to provide based on an amount of modulation desired.

The method 515 begins at process block 517, which includes receive photodetector signal(s). For example, the control electronics 112 may receive one or more data signals from the photodetector 108. The one or more data signals may indicate the intensity of incident light over one or more wavelength ranges, such as of the visible light spectrum. In some embodiments, the photodetector is a single photodetector capable of measuring light intensity over red, green and blue wavelengths, but may have an infrared filter. In such an embodiment, the data signal may include the light intensity across the RGB portions of the visible spectrum. In other embodiments, the photodetector includes two photodiodes with each photodiode tuned to different portions of the visible spectrum, such as blue and red. In such an embodiment, the data signal includes a data signal from each of the two photodiodes that indicates the light intensity across the blue and red wavelengths.

The process block 517 is followed by process block 519, which includes compare photodetector signal(s) to previous photodetector signal(s). The comparison of the current and previous photodetector signal(s) may be performed by the control electronics 112, and/or the control logic 436, e.g., by the modulation logic 468. The result of the comparison may be evaluated by the control logic/control electronics 436, 112 in process block 521, which determines if the difference between the prior and current photodetector signal(s) is greater than a threshold. The decision of process block 521 may be determined irrespective of wavelength. If so, then process block 523 follows. If the difference is less than the threshold, however, then the process block 517 follows and the comparison and evaluation repeats using new photodetector signal(s) and the current photodetector signal(s) becomes the previous photodetector signal(s). The threshold may be environmentally dictated and may represent robust or natural change within an environment or between two environments. For example, the threshold may indicate a change from an inside light setting to an outside light setting, or vice versa. The threshold may be a user adjustable setting in some embodiments, and may include changes of 10%, 20%, 30%, etc.

The process block 523 determines whether the difference greater than the threshold is associated with a first wavelength range, such as the red wavelength range. The first wavelength range may be associated with a first photodiode, or may be the long wavelength portion of a data signal provided by the photodetector. If no, then process block 525 follows. If yes, however, then process block 527 follows, which includes adjust the voltage provided to the first LC cell. Adjusting the first LC cell may include increasing or decreasing a voltage provided to the first LC cell to change an operational state of the first LC cell. The adjustment of the first LC cell may result in an increase in visual field modulation, e.g., more light attenuation, or a decrease in visual field modulation, e.g., less light attenuation. After the adjustment of the first LC cell, the process block 523 may be repeated to determine if difference greater than the threshold persists. If so, then the process block 527 is repeated, but the method may proceed to process block 525 if the large difference no longer persists.

The process block 525 determines whether the difference greater than the threshold is associated with a second wavelength range, such as the blue wavelength. The second wavelength range may be associated with a second photodiode, or may be the short wavelength portion of the data signal provided by the photodetector. If no, then process block 517 follows and the method 515 repeats. If yes, however, process block 529 follows, which includes adjust second LC cell voltage. The voltage may be adjusted up or down to adjust an amount of filtering performed by the second LC cell to change an operational state of the second LC cell. After adjustment, then process block 525 is repeated to determine if the difference persists. If so, then process block 529 is repeated. If not, then the method 515 may start anew.

The process blocks 523 and 525 may operate independently to change the operational state of the ophthalmic device between the matrix of possible operational states. For example, the ophthalmic device, based on the method 515, may change between the OFF state, and the first, second and third ON states, as discussed above, depending on a changing light environment. For example, moving from inside to outside on a bright clear day may result in the method 515 changing the operational state of the ophthalmic device from an OFF state to a first ON state so that incident light is both attenuated and filtered at the low wavelengths. Alternatively, if the environment includes facing a computer monitor, the ophthalmic device may be placed into the operational state that filters low wavelength light, which may be either the second or third ON state.

While the process blocks 523 and 525 are discussed as being associated with attenuation and filtering, respectively, the opposite could also be implemented. Additionally, process blocks 523 and 525 (and process blocks 527 and 529) may also be performed in parallel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An ophthalmic device comprising:
a first liquid crystal cell including a first dichroic dye that attenuates a first wavelength range;
a second liquid crystal cell including a second dichroic dye that attenuates a second wavelength range different than the first wavelength range, wherein the first and second liquid crystal cells are in optical series so that incident light on the ophthalmic device passes through both the first and second liquid crystal cells;
a photodetector positioned within the ophthalmic device to detect the incident light and coupled to output a data signal indicative of a property of the incident light; and control electronics coupled to receive the data signal from the photodetector in response to the incident light, and further coupled to independently and dynamically control the first and second liquid crystal cells based at least in part on the data signal.

2. The ophthalmic device of claim 1, wherein the control electronics includes control logic including instructions that, when executed by a processor, cause the control electronics to:
  determine if the data signal shows a change above a threshold from a previous data signal; and
  based on the change being greater than the threshold, adjust a control voltage provided to either the first or second liquid crystal cell.

3. The ophthalmic device of claim 2, wherein the photodetector includes first and second photodiodes with the first photodiode associated with the first wavelength range and the second photodiode associated with the second wavelength range, and wherein the control logic includes instructions that, when executed by the control electronics, cause the control electronics to:
  adjust a control voltage of the first liquid crystal cell to attenuate the incident light based on the change being greater than the threshold in the first wavelength range; or
  adjust a control voltage of the second liquid crystal cell to filter the incident light based on the change being greater than the threshold in the second wavelength range.

4. The ophthalmic device of claim 1, wherein the first dichroic dye is a broadband neutral density dye.

5. The ophthalmic device of claim 1, wherein the second dichroic dye is a narrowband filter dye.

6. The ophthalmic device of claim 1, wherein the first dichroic dye is a narrowband filter dye covering the first wavelength range, and the second dichroic dye is a narrowband filter dye covering the second wavelength range.

7. The ophthalmic device of claim 1, wherein the first or second dichroic dye is a broadband neutral density dye, and the second or first dichroic dye is a narrowband filter dye.

8. The ophthalmic device of claim 1, wherein the first liquid crystal cell includes:
  a first anterior electrode coupled to the control electronics;
  a first anterior liquid crystal alignment layer;
  a first posterior electrode coupled to the control electronics;
  a first posterior liquid crystal alignment layer; and
  a first liquid crystal layer including first liquid crystals and the first dichroic dye, the first liquid crystal layer disposed between the first anterior and posterior liquid crystal alignment layers.

9. The ophthalmic device of claim 8, wherein the control electronics, based at least in part on the data signal, provides a first voltage to the first anterior and posterior electrodes to establish a first potential difference across the first liquid crystal layer, wherein the first potential difference causes the first liquid crystals to rotate an amount based on a level of the first potential difference.

10. The ophthalmic device of claim 1, wherein the second liquid crystal cell includes:
  a second anterior electrode coupled to the control electronics;
  a second anterior liquid crystal alignment;
  a second posterior electrode coupled to the control electronics;
  a second posterior liquid crystal alignment layer; and
  a second liquid crystal layer including second liquid crystals and the second dichroic dye, the second liquid crystal layer disposed between the second anterior and posterior liquid crystal alignment layers.

11. The ophthalmic device of claim 10, wherein the control electronics, based at least in part on the data signal, provides a second voltage to the second anterior and posterior electrodes to establish a second potential difference across the second liquid crystal layer, wherein the second potential difference causes the second liquid crystals to rotate an amount based on a level of the second potential difference.

12. The ophthalmic device of claim 1, further comprising an enclosure including an anterior side and a posterior side sealed to the anterior side.

13. The ophthalmic device of claim 1, further comprising a substrate coupled to provide mechanical support to the first and second liquid crystal cells, to the photodetector, and to the control electronics.

14. The ophthalmic device of claim 1, further including a third liquid crystal cell arranged in optical series with the first and second liquid crystal cells, and coupled to the control electronics to provide dynamic accommodation.

15. The ophthalmic device of claim 1, wherein the property of the incident light comprises a spectral content of the incident light.

16. A method for dynamic visual field modulation using an ophthalmic device, the method comprising:
  receiving, by control logic, a data signal indicative of light intensity with respect to a wavelength of incident light on the ophthalmic device;
  comparing, by the control logic, the data signal to a previous data signal;
  determining, by the control logic, whether a difference between the data signal and the previous data signal is greater than a threshold; and
  based on the difference being greater than the threshold, changing, by the control logic, an operational state of either a first or second liquid crystal cell of the ophthalmic device, wherein the first liquid crystal cell includes a first dichroic dye that attenuates a first wavelength range, and the second liquid crystal cell includes a second dichroic dye different than the first dichroic dye that attenuates a second wavelength range different than the first wavelength range, wherein the first and second liquid crystal cells are arranged in optical series to the incident light.

17. The method of claim 16, wherein based on the difference being greater than the threshold, changing, by the control logic, an operational state of either a first or second liquid crystal cell comprises:
  placing the first and second liquid crystal cells in an on state based on the differenced being greater than the threshold over first and second wavelength ranges.

18. The method of claim 17, wherein placing the first and second liquid crystal cells in the on state causes the ophthalmic device to attenuate and filter the incident light.

19. The method of claim 16, wherein based on the difference being greater than the threshold, changing, by the control logic, an operational state of either a first or second liquid crystal cell comprises:
  placing the first liquid crystal cell in an on state based on the difference being greater than the threshold over a first wavelength range; and
  placing the second liquid crystal cell in an off state based on the difference being less than the threshold over a second wavelength range.

20. The method of claim 19, wherein placing the first liquid crystal cell in the on state, and placing the second liquid crystal cell in the off state causes the ophthalmic device to attenuate the incident light.

21. The method of claim 16, wherein based on the difference being greater than the threshold, changing, by the control logic, an operational state of either a first or second liquid crystal cell comprises:
   placing the first liquid crystal cell in an off state based on the difference being less than the threshold over a first wavelength range; and
   placing the second liquid crystal cell in an on state based on the difference being greater than the threshold over a second wavelength range.

22. The method of claim 21, wherein placing the first liquid crystal cell in the off state, and placing the second liquid crystal cell in the on state causes the ophthalmic device to filter the incident light.

23. An ophthalmic device comprising:
   a first liquid crystal cell including a first dichroic dye;
   a second liquid crystal cell including a second dichroic dye, wherein the first and second liquid crystal cells are in optical series so that incident light on the ophthalmic device passes through both the first and second liquid crystal cells;
   a photodetector positioned within the ophthalmic device to detect the incident light, wherein the photodetector is configured to sense a first characteristic of the incident light in a first wavelength range and generate a first data signal indicative of the first characteristic and configured to sense a second characteristic of the incident light in a second wavelength range, different than the first wavelength range, and generate a second data signal indicative of the second characteristic;
   control electronics coupled to the photodetector to receive the first and second data signals in response to the incident light, and further coupled to the first and second liquid crystal cells to independently and dynamically control the first liquid crystal cell based at least in part on the first data signal and the second liquid crystal cell based at least in part on the second data signal.

24. The ophthalmic device of claim 23, wherein the photodetector comprises:
   a first photodiode tuned to the first wavelength range to output the first data signal indicative of the incident light in the first wavelength range; and
   a second photodiode tuned to the second wavelength range, different than the first wavelength range, to output the second data signal indicative of the incident light in the second wavelength range.

25. The ophthalmic device of claim 23, wherein the first characteristic comprises a first intensity of the incident light within the first wavelength range and the second characteristic comprises a second intensity of the incident light with the second wavelength range.

* * * * *